United States Patent Office 3,370,920
Patented Feb. 27, 1968

3,370,920
STABILIZATION OF SULPHUR TRIOXIDE WITH A CARBONYL DIHALIDE
Ralph Victor Riley, Thomas Frederick Eden, and William Derek Hopkinson, near Chesterfield, England, assignors to The Staveley Iron & Chemical Company Limited, Chesterfield, Derbyshire, England, a British company
No Drawing. Filed Feb. 12, 1963, Ser. No. 257,827
Claims priority, application Great Britain, Feb. 12, 1962, 5,375/62
8 Claims. (Cl. 23—174)

This invention relates to liquid sulphur trioxide, to methods of producing stabilised liquid sulphur trioxide and to liquid sulphur trioxide so produced.

As is well known liquid sulphur trioxide tends to polymerise after a period of standing to form solid polymers. It is usual therefore to include a stabiliser in liquid sulphur trioxide in order to inhibit this polymerisation.

We have now found that liquid sulphur trioxide can be stabilised with carbonyldihalides of which the most readily available is carbonyldichloride ($COCl_2$), sometimes known as phosgene.

According to one aspect of the invention there is provided a method of producing stabilised liquid sulphur trioxide which method comprises mixing with liquid surphur trioxide a carbonyldihalide in amount sufficient to stabilise the liquid.

Preferably the carbonyldihalide, when carbonyldichloride comprises 0.10% to 1.5% by weight of the liquid sulphur trioxide. The proportion of carbonyldihalide used should be related to the concentration of sulphuric acid in the liquid sulphur trioxide.

According to one method of the invention carbonyldichloride is admixed with a portion of liquid sulphur trioxide in an amount sufficient to provide a high concentration of carbonyldichloride in the treated portion, and the portion is combined with the remainder of the liquid sulphur trioxide to be stabilised.

The carbonyldichloride may be mixed with the liquid sulphur trioxide by adding it in liquid or gaseous form.

The liquid sulphur trioxide may be prepared by distilling oleum, a solution of sulphur trioxide in sulphuric acid, for example as described in United States specification No. 219,002. Stabilised liquid sulphur trioxide according to the present invention may be produced by adding the carbonyldihalide during the distillation. If the oleum is subject to double distillation, carbonyldichloride may be added to the oleum after the first distillation and before the last distillation.

The forerunnings will be richer in carbonyldichloride due to its greater volatility. Care is therefore taken to ensure that the forerunnings are thoroughly mixed with the main bulk of the liquid sulphur trioxide distillate.

Alternatively the carbonyldichloride may be added during the first and/or the second distillation. More carbonyldichloride may be mixed with the distillate.

Preferably the liquid with which the carbonyldihalide is mixed comprises at least 80% preferably at least 95%, by weight free sulphur trioxide.

In the double distillation as above mentioned, the sulphur trioxide content by weight of the oleum may, for example, vary from 5 to 65% preferably from 13 to 20%, in the first still and from 80 to nearly 100% preferably from 95 to nearly 100% in the second still.

According to another aspect of the invention there is provided a stabilised liquid consisting essentially of liquid sulphur trioxide and a carbonyldihalide.

We have found that carbonyldichloride is soluble up to 12% by weight for weight in liquid sulphur trioxide at 20° C. and stabilises liquid sulphur trioxide very satisfactorily. Liquid sulphur trioxide which has been stabilised with carbonyldichloride when distilled leaves little or no residue. Further the amount of carbonyldichloride can be very accurately metered when being added to the liquid sulphur trioxide. Carbonyldichloride is, at present prices, an extremely economical substance to be used as a stabiliser.

Following is a description by way of example of methods of carrying the present invention into effect.

Example I

A vessel containing a liquid sulphur trioxide distillate, was fitted with a drying tube to the atmosphere, and a delivery tube for carbonyldichloride. Gaseous carbonyldichloride was passed into the sulphur trioxide until the desired amount had been absorbed to stabilise the liquid. The process is easily monitored by arranging to weigh the carbonyldichloride container during the discharge of the gas. Mixing of the liquid sulphur trioxide, carbonyldichloride, mixture may be carried out mechanically if necessary, e.g. by stirring. However, it has been found that in the process just described, the passage of carbonyldichloride bubbles provides sufficient agitation of the mixture.

Example II

A 5% w./w. solution of carbonyldichloride in liquid sulphur trioxide was made up by bubbling carbonyldichloride gas through liquid sulphur trioxide as described in Example I. 6 parts, by weight, of this solution were added to and mixed with 100 parts by weight, of liquid sulphur trioxide. The resulting product was satisfactorily stabilised.

Example III

Oleum consisting of sulphuric acid 80% by weight and sulphur trioxide 20% by weight was distilled to yield a distillate containing 95% by weight free sulphur trioxide. This distillate was then redistilled and during the second distillation carbonyldichloride was bubbled into the oleum contained in the still to give a distillate consisting of liquid sulphur trioxide and 0.32% by weight of carbonyldichloride.

Example IV

Example I was repeated to give a liquid sulphur trioxide distillate which contained 1400 p.p.m. sulphuric acid and 0.68% carbonyldichloride.

The following table exemplifies sulphur trioxide distillates stabilised by carbonyldichloride according to the invention.

TABLE

| P.p.m. $H_2SO_4$ in $SO_3$ | 0.16% $COCl_2$ in $SO_3$ | 0.32% $COCl_2$ in $SO_3$ | 0.68% $COCl_2$ in $SO_3$ |
|---|---|---|---|
| 0 | Stable | Stable | Stable. |
| 540 | Polymerized | do | Do. |
| 1,400 |  | Polymerized | Do. |

Samples were tested for stability by freezing at —5° C. for 72 hour periods and then re-melting at ambient temperatures before re-freezing; a sample was not regarded as being stable until it has survived at least four such cycles without displaying more than 1% polymerisation.

Example V

Carbonyldichloride was introduced into the final distillate from a double distillation process carried out on an oleum containing 20% free sulphur trioxide until the distillate contained 0.35% of carbonyldichloride measured by its increase in weight. The final mixture consisted of 99.64% sulphur trioxide, 0.35% carbonyldichloride and 0.01% sulphuric acid by weight. Although this material was subjected to six freezing cycles of the type described in Example IV, there was no indication that any solid polymer had been formed at the end of the test period.

Results similar to those described in the above examples may be obtained with carbonyldibromide and the other carbonyldihalides including carbonyldihalides having mixed halides.

We claim:

1. A method of preventing polymerization of liquid sulfur trioxide by the distillation of oleum comprising mixing the liquid to be distilled with a carbonyl dihalide, selected from the group consisting of carbonyl dichloride and carbonyl dibromide, in a sufficient amount to prevent the formation of solid polymers.

2. A method of preventing polymerization of liquid sulfur trioxide by the distillation of oleum comprising distilling oleum to produce a sulfur trioxide distillate and mixing said distillate with a carbonyl dihalide selected from the group consisting of carbonyl dichloride and carbonyl dibromide, in a sufficient amount to prevent the formation of solid polymers.

3. A liquid sulfur trioxide composition containing a quantity of a carbonyl dihalide in a sufficient amount to prevent the formation of solid polymers.

4. A liquid sulfur trioxide composition as claimed in claim 3 wherein said carbonyl dihalide is selected from the group consisting of carbonyl dichloride and carbonyl dibromide.

5. A liquid sulfur trioxide composition as claimed in claim 3 wherein said carbonyl dihalide has mixed halides.

6. A liquid sulfur trioxide composition as claimed in claim 3 wherein at least 0.16% by weight of said carbonyl dihalide is present.

7. A liquid sulfur trioxide composition as claimed in claim 3 containing no more than 540 parts per million of sulfuric acid and at least 0.32% by weight of said carbonyl dihalide.

8. A liquid sulfur trioxide composition as claimed in claim 3 containing no more than 1400 parts per million of sulfuric acid and at least 0.68% by weight of said carbonyl dihalide.

References Cited

UNITED STATES PATENTS

| | | | |
|---|---|---|---|
| 2,856,266 | 10/1958 | Beau | 23—174 |
| 3,042,490 | 7/1962 | Sauls et al. | 23—166 |
| 2,403,459 | 7/1946 | Rollinson | 23—174 |
| 2,872,290 | 2/1959 | Blanchard | 23—174 |

OSCAR R. VERTIZ, *Primary Examiner.*

MAURICE A. BRINDISI, *Examiner.*

R. M. DAVIDSON, A. GREIF, *Assistant Examiners.*